(12) United States Patent
Toriyama et al.

(10) Patent No.: US 7,123,336 B2
(45) Date of Patent: Oct. 17, 2006

(54) TWISTED NEMATIC LIQUID CRYSTAL MATERIAL WITH CERTAIN VALUES FOR DIELECTRIC CONSTANT ANISOTROPY, TWISTED ELASTICITY MODULUS AND REFRACTIVE INDEX ANISOTROPY

(75) Inventors: Akiko Toriyama, Kanagawa (JP); Mieko Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/673,271

(22) Filed: Sep. 30, 2003

(65) Prior Publication Data
US 2005/0024578 A1    Feb. 3, 2005

Related U.S. Application Data

(63) Continuation-in-part of application No. 10/670,527, filed on Sep. 26, 2003, now abandoned.

(30) Foreign Application Priority Data
Sep. 30, 2002 (JP) ............................ P2002-285322
Sep. 25, 2003 (JP) ............................ P2003-334169
Sep. 30, 2003 (JP) ............................ P2003-341336

(51) Int. Cl.
G02F 1/1333    (2006.01)

(52) U.S. Cl. ................. 349/179; 349/180; 349/181; 349/167

(58) Field of Classification Search ........... 349/179, 349/180
See application file for complete search history.

(56) References Cited

U.S. PATENT DOCUMENTS

| | | | |
|---|---|---|---|
| 6,356,332 B1 * | 3/2002 | Ichikawa et al. | 349/146 |
| 6,853,435 B1 * | 2/2005 | Tanaka et al. | 349/177 |
| 2002/0039167 A1 * | 4/2002 | Kitahora et al. | 349/186 |
| 2002/0054266 A1 * | 5/2002 | Nishimura | 349/149 |
| 2003/0058385 A1 * | 3/2003 | McKnight et al. | 349/96 |
| 2003/0151710 A1 * | 8/2003 | Tanaka et al. | 349/123 |

FOREIGN PATENT DOCUMENTS

| JP | 08-101403 | 4/1996 |
|---|---|---|
| JP | 2001-265255 | 9/2001 |

* cited by examiner

*Primary Examiner*—Andrew Schechter
*Assistant Examiner*—(Nancy) Thanh-Nhan P Nguyen
(74) *Attorney, Agent, or Firm*—Rader, Fishman & Grauer PLLC; Ronald P. Kananen

(57) ABSTRACT

An active matrix drive type liquid crystal display element capable of preventing deterioration of display capability caused by a stripe domain, and a projection type display device using the liquid crystal display element, by which there is provided a projection type display device comprising a light source; a light convergence optical system for guiding a light emitted from said light source to a liquid crystal display element; and a projection optical system for enlarging and projecting a light subjected to light modulation by said liquid crystal display element; wherein the liquid crystal display element is configured by holding a liquid crystal layer between a pair of substrates arranged to face to each other, and a twisted nematic type liquid crystal material used in the liquid crystal layer satisfies dielectric constant anisotropy $\Delta\varepsilon$ of $0<\Delta\varepsilon<8$ and twist elasticity modulus $K_{22}$ of $K_{22}>6.0$ pN when the refractive index anisotropy $\Delta n$ is $0.16 \leq \Delta n \leq 0.18$ and satisfies dielectric constant anisotropy $\Delta\varepsilon$ of $0<\Delta\varepsilon<13$ and twist elasticity modulus $K_{22}$ of $K_{22}>3.0$ pN when the refractive index anisotropy $\Delta n$ is $0.18 \leq \Delta n \leq 0.20$.

6 Claims, 15 Drawing Sheets

TWISTED NEMATIC LIQUID CRYSTAL MATERIAL WITH CERTAIN VALUES FOR DIELECTRIC CONSTANT ANISOTROPY, TWISTED ELASTICITY MODULUS AND REFRACTIVE INDEX ANISOTROPY

This Application is a Continuation-in-Part of U.S. patent application Ser. No. 10/670,527 filed Sep. 26, 2003 now abandoned.

BACKGROUND OF THE INVENTION

1. Field of the Invention

The present invention relates to a liquid crystal display element and a projection type display device using the liquid crystal display element, and particularly relates to a liquid crystal display element using twisted nematic type liquid crystal used for a liquid crystal layer and a projection type display device using the liquid crystal display element.

2. Description of the Related Art

In a liquid crystal projector and other projection type display device, a light emitted from a light source is divided to red, green and blue, the respective color lights are modulated by three light valves composed of a liquid crystal display element (hereinafter, referred to as an LCD), color light fluxes after the modulation are again composed and projected by being enlarged on a projection surface. As a light valve for a liquid crystal projector, etc., an active matrix drive type LCD driven by a thin film transistor (hereinafter, referred to as TFT) is generally used.

A nematic liquid crystal is used in most of active matrix drive type LCDs and an optical rotatory mode LCD may be mentioned as the main display method. An optical rotatory mode LCD is a twisted nematic (TN type) liquid crystal having molecular arrangement twisted by 90 degrees, which is, in principle, black and white display and has a high contrast ratio and preferable gray scale display capability.

To attain uniform display of an active matrix drive type LCD, it is necessary that liquid crystal molecules are uniformly aligned all over a substrate surface.

In the substrate formed with two electrodes formed with an alignment film, the alignment films of each substrate are arranged to face to each other and put together with a seal on a seal region around a pixel display region on which an image is actually displayed. To control a space between the substrates, a globular spacer called a micropearl or a columnar spacer formed by a resist is used before putting together as explained above.

Vacant cells are formed through the process, then, liquid crystal is encapsulated in the vacant cells, so that liquid crystal cells are produced.

Note that the above liquid crystal is composed of several kinds of elemental materials of a liquid crystal and also is called a liquid crystal composition. A light refractive plate is attached to the produced liquid crystal cell and a liquid crystal display element is produced.

When applying a voltage to pixel electrodes arranged in matrix, a line inversion drive method for inverting the application voltage on every other line and a column inversion drive method for inverting the application voltage on every other column are widely used to improve display quality.

Since the application voltage is inverted between adjacent pixel electrodes in these driving methods, as shown in FIG. 14, it suffers from the disadvantage that a reverse tilt domain RTDM having an opposite tilt direction from a pre-tilt direction originally given by the liquid crystal is generated in a pixel portion corresponding to each pixel electrode PXLE (e.g. Japanese Patent No. 2934875).

Particularly, in a normally white mode liquid crystal display, void occurs on a disclination line DSCL on a boundary with a normal region and contrast declines. Therefore, a tilt angle is made large to make the reverse tilt domain RTDM small, but a disadvantage of deteriorating production yield is brought. Also, leaking of a light is reduced by providing a light block material in accordance with a position where the reverse tilt domain arises, but there is a disadvantage that the aperture ratio is reduced.

Thus, as one of methods to improve the contrast ratio in the TN type LCD, a method of heightening an effective voltage to be applied between a common electrode and pixel electrode facing to each other, that is, widening a dynamic range has attracted attention.

When heightening the effective voltage to be applied between the common electrode and pixel electrode facing to each other as above, not only that alignment of liquid crystal molecules becomes more vertical, but the position where the disclination line DSCL arises shifts to the peripheral direction (outer side) in the pixel portion, so that the contrast ratio can be improved.

Also, an active matrix drive type LCD used as a light valve of a projection type display device is made more compact as a liquid projector and other projection type display device gets more compact, while pixels are pursued to be finer and brighter. As the pixels become finer, pitch intervals of pixels of liquid crystal display element becomes narrower. For example, in the case of a type where a substrate size is 22.9 mm (0.9 inch) extended graphics array (XGA), the pixel number becomes 1024×768 and the pixel pitch becomes 18 μm.

However, as pixels get finer, spaces between transparent electrodes of each pixel (for example, ITO: indium tin oxide) become furthermore narrower and an electric field in the crossing direction is generated when a potential in each pixel is inverted. Due to the electric field in the crossing direction, disadvantages arise that an alignment of liquid crystal molecules on a transparent electrode boundary portion is distorted, a boundary between the distorted portion and normal portion (also referred to as a disclination line) arises as a display defect, and the contrast declines. Furthermore, as pixels get brighter, the display defect tends to be more notable.

To solve the disadvantage, a method of changing a position of the above boundary line in accordance with a position of a contact hole has been proposed (for example, refer to the Patent Article 2). Also, a method of controlling the electric field in the crossing direction by making a TFT to have different levels has been proposed (for example, refer to the Patent Article 3).

[Patent Article] The Patent Publication No. 2934875 paragraphs 0005 to 0006

[Patent Article] The Unexamined Patent Publication No. 2001-265255 (pp. 8 to 13, FIG. 2 and FIG. 3)

[Patent Article] The Unexamined Patent Publication No. 2001-265255 (p. 19, FIG. 17)

However, when the effective voltage is made higher as explained above, a reverse tilt domain disappears in a part of pixels and the disappearance state becomes a quasi-stable state. Thus, as shown in FIG. 15, hysteresis arises in V (voltage)—T (light transmittance intensity) characteristics, and when changing from black display to intermediate grade display, an image quality defect by an extinction point and, particularly, a serious image quality defect by an extinction line as a result that a display defect of the reverse tilt domain propagates to an adjacent reverse tilt domain are caused.

The above image defect will be referred to as a stripe domain.

As a result, it is impossible to apply a voltage (effective voltage) of a certain value or more to between the common electrode and pixel electrode facing to each other, and there is a disadvantage that a desired contrast ratio cannot be realized. This disadvantage notably arises when a distance between adjacent pixel electrodes is made short to realize a finer liquid crystal display element with a high aperture ratio.

Accordingly, in a matrix type liquid crystal display device comprising a switching element, such as a thin film transistor (TFT), it is difficult to strike a balance between the high aperture ratio and the high contrast ratio.

However, both of the inventions described in the Patent Articles 2 and 3 are a method of suppressing an electric field in the crossing direction by changing a shape to strengthen an electric field in the vertical direction.

Therefore, there are disadvantages that (1) due to the provision of different levels, there arises a region where rubbing cannot be sufficiently performed and a display defect is caused, and (2) due to the complex configuration, the yield declines and the production cost becomes high.

Also, as the most effective countermeasure, there is a method of preventing an affect by the electric field in the crossing direction by strengthening the electric field in the vertical direction of each substrate by making a cell gap thinner. In the case where two light refractive plates are orthogonally arranged and the display is normally a white display being white when not turned on, it is designed to be capable of obtaining the maximum transmissivity when a refractive index anisotropy $\Delta n$ of the liquid crystal material× cell gap=480 nm from the gooch-tarry formula. Namely, to obtain the maximum trasmissivity, the refractive index anisotropy $\Delta n$ of the liquid crystal has to be high when applying the countermeasure of making the cell gap thin as explained above.

In the cell configuration of making the cell gap thin as above, space controlling by a columnar spacer having been applied in recent years is essential, but there is a disadvantage that distortion of a stripe domain arises around the spacer portion due to formation of the spacer. Also, as those applied with a liquid crystal material having a high $\Delta n$, in pixel pitch of 18 µm and a substrate size of 22.9 mm (0.9 inch) XGA, a liquid crystal material having a $\Delta n$ of less than 0.16 is currently used and the cell gap is 3.0 µm. In the above cell design, a stripe domain arises at a voltage of 0.4 V or less, which is lower than a normal drive voltage of 5.0V, and ends up in a display defect.

SUMMARY OF THE INVENTION

An object of the present invention is to provide an active matrix drive type liquid crystal display element (LCD) and a projection type display device using the liquid crystal display element capable of solving the above disadvantages by investigating a relationship of property parameters and a stripe domain as to a liquid crystal material having a high refractive index anisotropy $\Delta n$ ($\Delta n$ is 0.16 or more) and realizing liquid crystal material design in a range of the property parameters not to cause any stripe domains, heightening a value of an application voltage of display defect occurrence, striking a balance between a high aperture ratio and high contrast ratio, moreover, having preferable transmissivity and other characteristics, and preventing a decline of display capability due to a stripe domain.

The present invention is on a liquid crystal display element and a projection type display device attained so as to solve the above disadvantages.

According to the present invention, there is provided a liquid crystal display element configured by holding a liquid crystal layer between a pair of substrates arranged to face to each other, wherein a twisted nematic type liquid crystal material used in the liquid crystal layer satisfies dielectric constant anisotropy $\Delta\epsilon$ of $0 < \Delta\epsilon < 8$ and twist elasticity modulus $K22$ of $K22 > 6.0$ pN when the refractive index anisotropy $\Delta n$ is $0.16 \leq \Delta n \leq 0.18$.

The dielectric constant anisotropy $\Delta\epsilon$ is a difference of a dielectric constant $\epsilon_{//}$ on the long axis side and a dielectric constant $\epsilon^\perp$ on the short axis side of the liquid crystal, and the smaller the value, the higher a voltage of causing a stripe domain becomes. Namely, the smaller the $\Delta\epsilon$, the harder a stripe domain is observed. It is considered that the smaller the value of $\Delta\epsilon$ is, the more balanced a liquid crystal molecular state becomes in terms of the molecular configuration and the less affected by a crossing electric field. For example, when assuming that the stripe domain occurrence voltage is 5V or more, the $\Delta\epsilon$ is required to be $\Delta\epsilon < 8$ from an experiment when $0.16 \leq \Delta n \leq 0.18$. Also, in a TN liquid crystal, $\Delta\epsilon > 0$.

Next, the larger the twist elasticity modulus $K22$, the higher the voltage of causing a stripe domain becomes. Namely, the larger the $K22$, the harder a stripe domain is observed. For example, when assuming that the stripe domain occurrence voltage is 5V or more, $K22$ is required to be $K22 > 6.0$ pN from an experiment when $0.16 \leq \Delta n \leq 0.18$.

Here, the elasticity modulus in the liquid crystal material will be explained. The elasticity modulus in a liquid crystal material is elasticity against deformation of azimuth of molecules, and there are three kinds of deformation called $K11$ (spray elasticity modulus), $K22$ (twist elastic modulus) and $K33$ (bend elasticity modulus) of a director indicating an average orientation of molecules. The $K11$ is deformation that the director becomes wide and is mainly a parameter largely depending on deformation near the Freedericksz transition. The $K22$ is deformation that the director gets twisted. The larger a value of $K22$, the harder each molecule gets twisted against an external force (an electric field and magnetic field). The $K33$ is deformation that the director bends. When considering an aggregate of liquid crystal molecules as an elastic body, it is compared to a force that the elastic body bends due to an external force. The larger a value of $K33$, the harder it is bent.

What corresponding to a force of distorting the alignment by the crossing electric field near a transparent electrode is considered to be the $K22$, and a liquid crystal material with a larger $K22$ becomes harder to be affected by the electric field against a twisting force. This mechanism indicates a phenomenon that the larger the $K22$, the harder a stripe domain occurs.

From the above, a twisted nematic type liquid crystal material used in the liquid crystal layer is required to satisfy the dielectric constant anisotropy $\Delta\epsilon$ of $0 < \Delta\epsilon < 8$ and the twist elasticity modulus $K22$ of $K22 > 6.0$ pN when the refractive index anisotropy $\Delta n$ is $0.16 \leq \Delta n \leq 0.18$.

According to the present invention, there is provided a liquid crystal display element configured by holding a liquid crystal layer between a pair of substrates arranged to face to each other, wherein a twisted nematic type liquid crystal material used in the liquid crystal layer satisfies dielectric constant anisotropy $\Delta\in$ of $0<\Delta\in<13$ and twist elasticity modulus $K22$ of $K22>3.0$ pN when the refractive index anisotropy $\Delta n$ is $0.18\leq\Delta n\leq0.20$.

In the same way as above, the dielectric constant anisotropy $\Delta\in$ is a difference of a dielectric constant $\in//$ on the long axis side and a dielectric constant $\in^\perp$ on the short axis side of the liquid crystal, and the smaller the value, the higher a voltage of causing a stripe domain becomes. Namely, the smaller the $\Delta\in$, the harder a stripe domain is observed. It is considered that the smaller the value of $\Delta\in$ is, the more balanced a liquid crystal molecular state becomes in terms of the molecular configuration and the less affected by a crossing electric field. For example, when assuming that the stripe domain occurrence voltage is 5V or more, the $\Delta\in$ is required to be $\Delta\in<13$ from an experiment when $0.18\leq\Delta n\leq0.20$. Also, in a TN liquid crystal, $\Delta\in>0$.

Next, the larger the twist elasticity modulus $K22$, the higher the voltage of causing a stripe domain becomes. Namely, the larger the $K22$, the harder a stripe domain is observed. For example, when assuming that the stripe domain occurrence voltage is 5V or more, $K22$ is required to be $K22>3.0$ pN from an experiment when $0.18\leq\Delta n\leq0.20$.

From the above, a twisted nematic type liquid crystal material used in the liquid crystal layer is required to satisfy the dielectric constant anisotropy $\Delta\in$ of $0<\Delta\in<13$ and the twist elasticity modulus $K22$ of $K22>3.0$ pN when the refractive index anisotropy $\Delta n$ is $0.18\leq\Delta n\leq0.20$.

According to the present invention, there is provided a projection type display device comprising a light source; a light convergence optical system for guiding a light emitted from the light source to a liquid crystal display element; and a projection optical system for enlarging and projecting a light subjected to light modulation by the liquid crystal display element; wherein the liquid crystal display element is configured by holding a liquid crystal layer between a pair of substrates arranged to face to each other, and a twisted nematic type liquid crystal material used in the liquid crystal layer satisfies dielectric constant anisotropy $\Delta\in$ of $0<\Delta\in<8$ and twist elasticity modulus $K22$ of $K22>6.0$ pN when the refractive index anisotropy $\Delta n$ is $0.16\leq\Delta n\leq0.18$.

In the above projection type display device, the liquid crystal display element is configured by holding a liquid crystal layer between a pair of substrates arranged to face to each other, wherein a twisted nematic type liquid crystal material used in the liquid crystal layer satisfies dielectric constant anisotropy $\Delta\in$ of $0<\Delta\in<8$ and twist elasticity modulus $K22$ of $K22>6.0$ pN when the refractive index anisotropy $\Delta n$ is $0.16\leq\Delta n\leq0.18$, so that deterioration of display capability caused by a stripe domain can be prevented.

According to the present invention, there is provided a projection type display device comprising a light source; a light convergence optical system for guiding a light emitted from the light source to a liquid crystal display element; and a projection optical system for enlarging and projecting a light subjected to light modulation by the liquid crystal display element; wherein the liquid crystal display element is configured by holding a liquid crystal layer between a pair of substrates arranged to face to each other, and a twisted nematic type liquid crystal material used in the liquid crystal layer satisfies dielectric constant anisotropy $\Delta\in$ of $0<\Delta\in<13$ and twist elasticity modulus $K22$ of $K22>3.0$ pN when the refractive index anisotropy $\Delta n$ is $0.18\leq\Delta n\leq0.20$.

In the above projection type display device, the liquid crystal display element is configured by holding a liquid crystal layer between a pair of substrates arranged to face to each other, wherein a twisted nematic type liquid crystal material used in the liquid crystal layer satisfies dielectric constant anisotropy $\Delta\in$ of $0<\Delta\in<13$ and twist elasticity modulus $K22$ of $K22>3.0$ pN when the refractive index anisotropy $\Delta n$ is $0.18\leq\Delta n\leq0.20$, so that deterioration of display capability caused by a stripe domain can be prevented.

According to the liquid crystal display device of the present invention, a twisted nematic type liquid crystal material used in the liquid crystal layer satisfies dielectric constant anisotropy $\Delta\in$ of $0<\Delta\in<8$ and twist elasticity modulus $K22$ of $K22>6.0$ pN when the refractive index anisotropy $\Delta n$ is $0.16\leq\Delta n\leq0.18$, and satisfies dielectric constant anisotropy $\Delta\in$ of $0<\Delta\in<13$ and twist elasticity modulus $K22$ of $K22>3.0$ pN when the refractive index anisotropy $\Delta n$ is $0.18\leq\Delta n\leq0.20$.

As explained above, since a liquid crystal material having strong resisting property against a stripe domain could be designed, stripe domains can be prevented and preferable display can be attained.

According to the projection type display device of the present invention, since the liquid crystal display element of the present invention is used, deterioration of display capability due to a stripe domain can be prevented.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

An embodiment according to a liquid crystal display element of the present invention will be explained with reference to FIG. 1 to FIG. 8.

Figure 1:
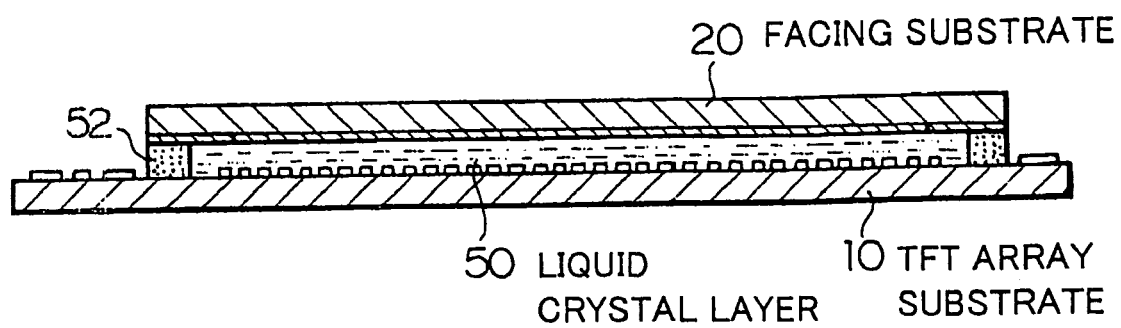
FIG. 1 is a cross-sectional view of the schematic configuration of a liquid crystal display element of the present invention.

As shown in FIG. 1, a liquid crystal display element 1 of the present invention is an active matrix type liquid crystal display element wherein a liquid crystal layer 50 is encapsulated in a space obtained by putting together a pair of substrates arranged to face to each other, that is, a TFT array substrate 10 and a facing substrate 20 via a seal 52.

As the liquid crystal layer 50 of the above liquid crystal display element 50, those having properties explained below will be used. A twisted nematic (hereinafter, referred to as TN) type liquid crystal material used in the liquid crystal layer 50 satisfies dielectric constant anisotropy $\Delta\epsilon$ of $0<\Delta\epsilon<8$ and a twist elasticity modulus $K22$ of $K22>6.0$ pN when refractive index anisotropy $\Delta n$ is $0.16 \leq \Delta n \leq 0.18$ at 20° C. Alternately, a twisted nematic liquid crystal material used for the liquid crystal layer 50 satisfies dielectric constant anisotropy $\Delta\epsilon$ of $0<\Delta\epsilon<13$ and a twist elasticity modulus $K22$ of $K22>3.0$ pN when refractive index anisotropy $\Delta n$ is $0.18 \leq \Delta n \leq 0.20$ at the room temperature (20° C. in the present embodiment).

Below, the liquid crystal layer 50 will be explained in detail. Note that a method of measuring property values of a liquid crystal material in the present embodiment explained below is learnt from "Basics and New Development of Liquid Crystal Material Study" (Sigma Publishing) pp. 161 to 191.

Also, all measurement values are under a measurement condition of controlling a temperature at the room temperature (20° C. in the present embodiment).

Liquid crystals adopted in the present embodiment are five kinds: A, B, C, D and E at $\Delta n=0.16$, five kinds: F, G, H, I and J at $\Delta n=0.18$, and three kinds: K, L and M at $\Delta n=0.20$. The liquid crystals of "A" to "M" were produced for the present embodiment.

Measurement of the refractive index anisotropy $\Delta n$ (ne-no) was made when a light source wavelength was 589 nm under the temperature control at 20° C.

TABLE 1

| Sample | $\Delta n$ | $\Delta\epsilon$ | K22 | Stripe Domain Occurence Voltage |
|---|---|---|---|---|
| A | 0.16 | 7.5 | 4.8 | 4.6 V |
| B | 0.16 | 7.5 | 8.0 | 6.0 V |
| C | 0.16 | 9.8 | 8.0 | 4.6 V |
| D | 0.16 | 12.8 | 4.0 | 3.9 V |
| E | 0.16 | 8.0 | 6.0 | 5.0 V |
| F | 0.18 | 13 | 3 | 5.0 V |

TABLE 1-continued

| Sample | $\Delta n$ | $\Delta\epsilon$ | K22 | Stripe Domain Occurence Voltage |
|---|---|---|---|---|
| G | 0.18 | 12.0 | 2.2 | 4.9 V |
| H | 0.18 | 9.8 | 10.1 | 6.5 V |
| I | 0.18 | 14.8 | 6.0 | 4.9 V |
| J | 0.18 | 14.0 | 2.2 | 4.5 V |
| K | 0.20 | 12.8 | 2.8 | 4.8 V |
| L | 0.20 | 11 | 7 | 5.6 V |
| M | 0.20 | 13.5 | 2.8 | 4.7 V |

The properties of "A" to "E" at $\Delta n=0.16$ are as below. The "A" is a material wherein $\Delta\epsilon$ is in a range ($\Delta\epsilon<8$) claimed in the present invention, and K22 is out of a range claimed in the present invention. The "B" is a material wherein both of $\Delta\epsilon$ and K22 are in the ranges ($\Delta\epsilon<8$ and $K22>6.0$ pN) claimed in the present invention. The "C" is a material wherein $\Delta\epsilon$ is out of the range claimed in the present invention, and K22 is in the range ($K22>6.0$ pN) claimed in the present invention. The "D" is a material wherein both of $\Delta\epsilon$ and K22 are out of the ranges claimed in the present invention. The "E" is a material wherein both of $\Delta\epsilon$ and K22 exhibit critical values of the ranges claimed in the present invention.

The properties of "F" to "J" at $\Delta n=0.18$ are as below. The "F" is a material wherein both of $\Delta\epsilon$ and K22 exhibit critical values of the ranges claimed in the present invention. The "G" is a material wherein $\Delta\epsilon$ is in the range ($\Delta\epsilon<13$) claimed in the present invention and K22 is out of the range claimed in the present invention. The "H" is a material wherein both of $\Delta\epsilon$ and K22 are in the ranges ($\Delta\epsilon<13$ and $K22>3.0$ pN) claimed in the present invention. The "I" is a material wherein $\Delta\epsilon$ is out of the range claimed in the present invention, and K22 is in the range ($K22>3.0$ pN) claimed in the present invention. The "J" is a material wherein both of $\Delta\epsilon$ and K22 are out of the ranges claimed in the present invention.

The properties of "K" to "M" at $\Delta n=0.20$ are as below. The "K" is a material wherein $\Delta\epsilon$ is in the range ($\Delta\epsilon<13$) claimed in the present invention and K22 is out of the range claimed in the present invention. The "L" is a material wherein both of $\Delta\epsilon$ and K22 are in the ranges ($\Delta\epsilon<13$ and $K22>3.0$ pN) claimed in the present invention. The "M" is a material wherein both of $\Delta\epsilon$ and K22 are out of the ranges claimed in the present invention.

Figure 2:
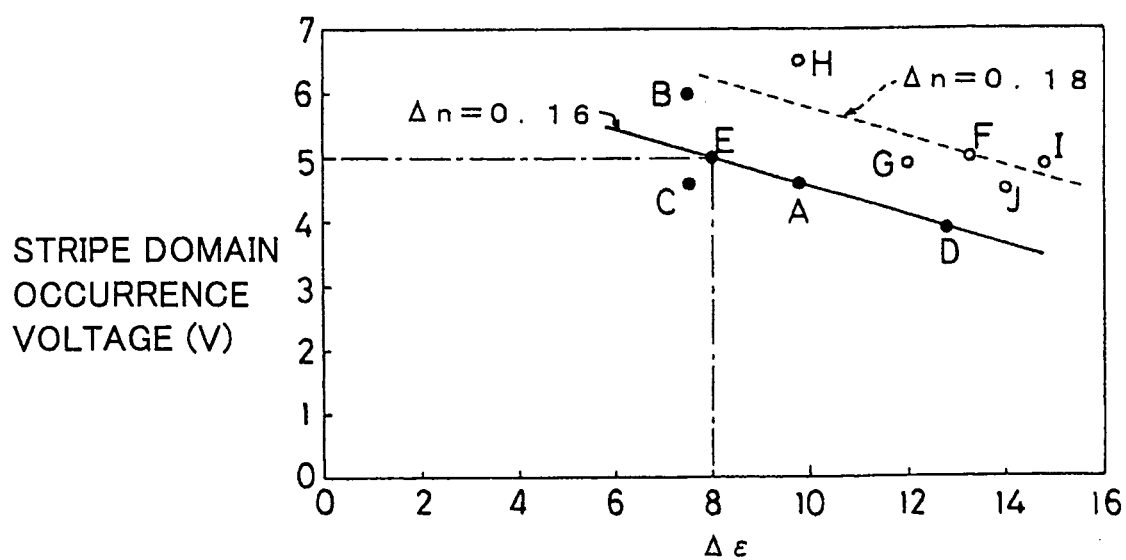
FIG. 2 is a view of a relationship of dielectric constant anisotropy $\Delta\in$ and a stripe domain occurrence voltage when refractive index anisotropy $\Delta n$ is $0.16\leq\Delta n\leq0.18$.
Figure 3:
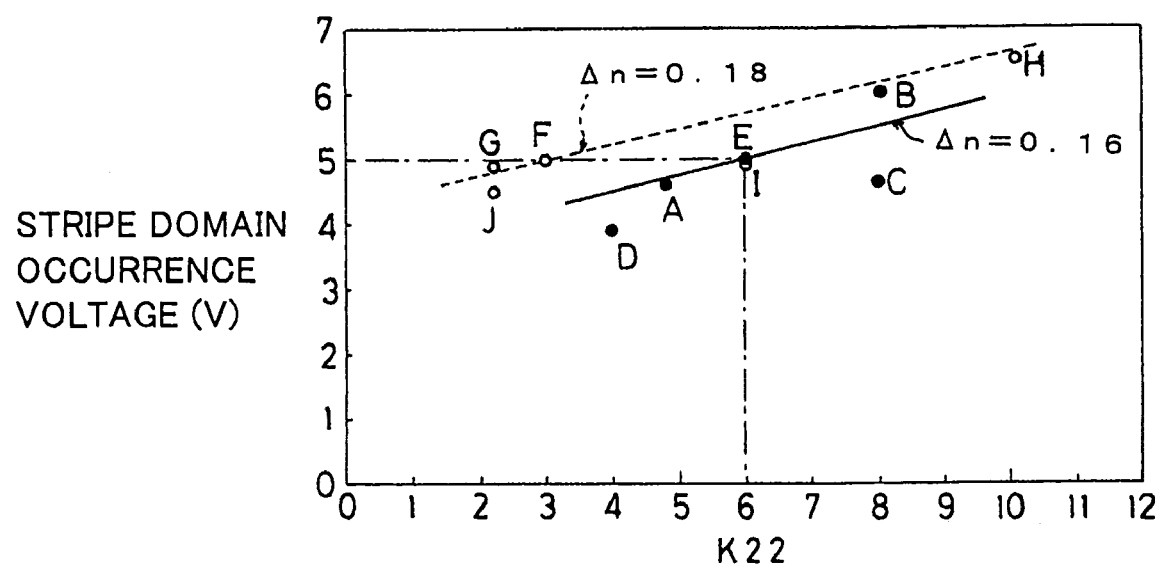
FIG. 3 is a view of a relationship of a twist elasticity modulus $K22$ and a stripe domain occurrence voltage when refractive index anisotropy $\Delta n$ is $0.16\leq\Delta n\leq0.18$.
Figure 4:
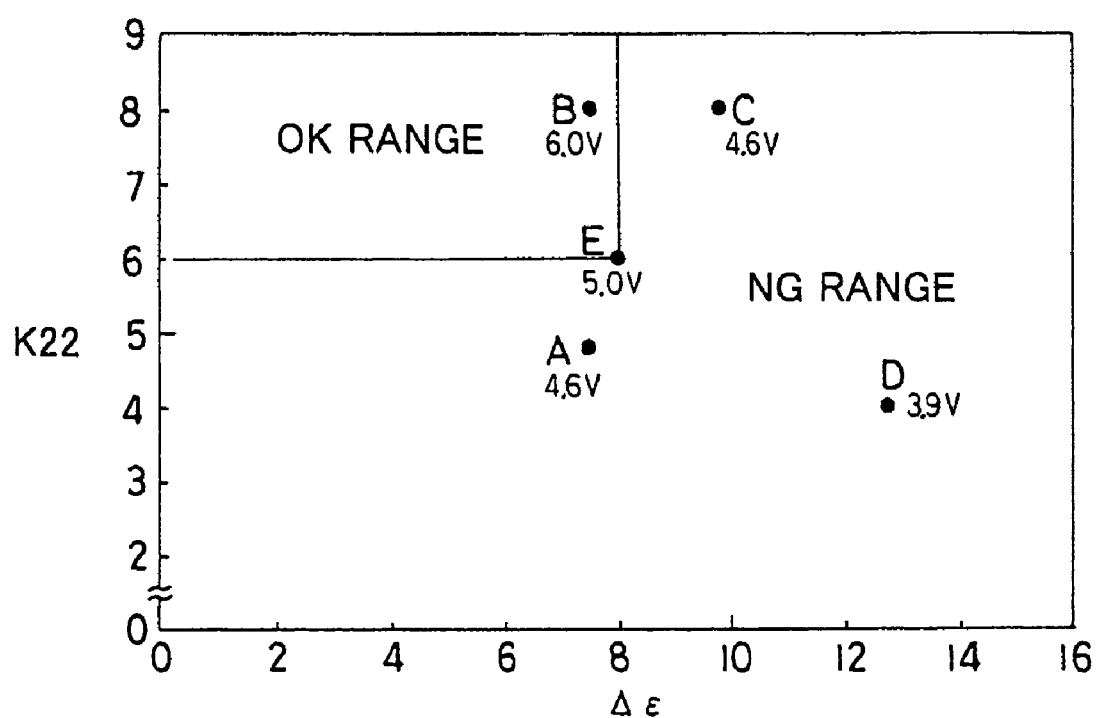
FIG. 4 is a view of a relationship of dielectric constant anisotropy $\Delta\in$ and a twist elasticity modulus $K22$ when refractive index anisotropy $\Delta n$ is $0.16\leq\Delta n\leq0.18$.

FIG. 2 to FIG. 4 are drawn based on the above measurement values. For example, an evaluation was made on a relationship of $\Delta\epsilon$ and a stripe domain occurrence voltage when varying the $\Delta\epsilon$ by using liquid crystal materials of $\Delta n=0.16$ and $\Delta n=0.18$. The result will be explained with reference to FIG. 2. In FIG. 2, an axis of ordinate indicates the stripe domain occurrence voltage and an axis of abscissa indicates $\Delta\epsilon$. In FIG. 2 to FIG. 7, the stripe domain occurrence voltage was defined as a voltage at a point a stripe domain occurred.

As shown in FIG. 2, as the $\Delta\epsilon$ became smaller, the voltage of stripe domain occurrence became higher. Namely, the smaller the $\Delta\epsilon$ became, the harder a stripe domain was observed. The $\Delta\epsilon$ is a difference between a dielectric constant $\epsilon//$ on a long axis side and the dielectric constant $\epsilon^\perp$ on a short axis side of the liquid crystal. It is considered the smaller the $\Delta\epsilon$, the more balanced in terms of the molecular structure a liquid crystal molecular state becomes and harder to get affected by a crossing electric field. For example, when assuming the stripe domain occurrence voltage is 5V or more, the $\Delta\epsilon$ is required to be 8 or less when $0.16 \leq \Delta n \leq 0.18$. Since it is limited to the TN mode in the present invention, $\Delta\epsilon>0$. Thus, the $\Delta\epsilon$ becomes $0<\Delta\epsilon<8$.

Next, an evaluation was made on a relationship of the twist elasticity modulus K22 and a stripe domain occurrence voltage when varying the K22, for example, by using liquid crystal materials of $\Delta n=0.16$ and $\Delta n=0.18$. The results will be explained with reference to FIG. 3. In FIG. 3, an axis of ordinate indicates the stripe domain occurrence voltage and an axis of abscissa indicates K22.

As shown in FIG. 3, the larger the K22, the higher the voltage of stripe domain occurrence. Namely, the larger the K22, the harder a stripe domain was observed. For example, when assuming the stripe domain occurrence voltage is 5V or more, the K22 is required to be 6.0 pN or more when $0.16 \leq \Delta n \leq 0.18$. Thus, the K22 becomes K22>6.0.

The elasticity modulus in a liquid crystal material is an elasticity modulus against deformation of azimuth of molecules, and there are three kinds of deformation called K11 (spray elasticity modulus), K22 (twist elasticity modulus) and K33 (bend elasticity modulus) of a director indicating average alignment of molecules. This is a parameter largely depending on deformation mainly near the Freedericksz transition. When considering an aggregate of liquid crystal molecules as an elastic body, it is compared to a force that the elastic body bends by an external force. When a value of the K33 becomes large, it becomes hard to be bent.

What corresponding to a force of distorting the alignment by the crossing electric field near a transparent electrode is considered to be the K22, and a liquid crystal material with a larger K22 becomes hard to be affected by the electric field against a twisting force. This mechanism indicates a phenomenon that the larger the K22, the harder a stripe domain occurs.

Accordingly, as shown in the view of a relationship of the K22 (an axis of ordinate) and the $\Delta\epsilon$ (an axis of abscissa) in FIG. 4, a twisted nematic type liquid crystal material used for a liquid crystal layer is required to satisfy the dielectric constant anisotropy $\Delta\epsilon$ of $0<\Delta\epsilon<8$ and the twist elasticity modulus K22 of K22>6.9 pN when the refractive index anisotropy $\Delta n$ is $0.16 \leq \Delta n \leq 0.18$ at 20° C.

Figure 5:
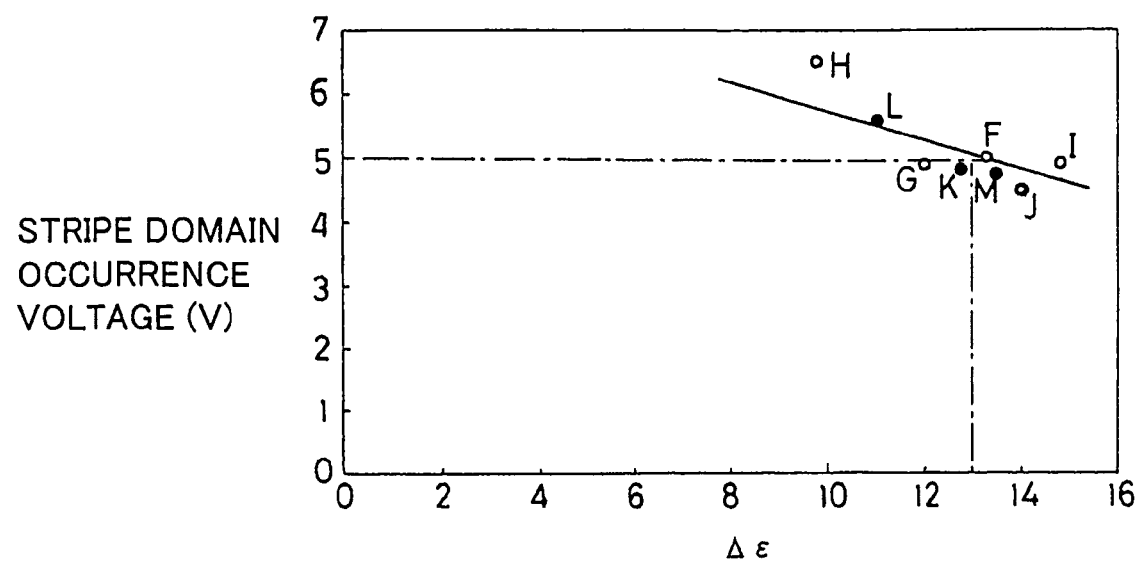
FIG. 5 is a view of a relationship of dielectric constant anisotropy $\Delta\in$ and a stripe domain occurrence voltage when refractive index anisotropy $\Delta n$ is $0.18\leq\Delta n\leq0.20$.
Figure 6:
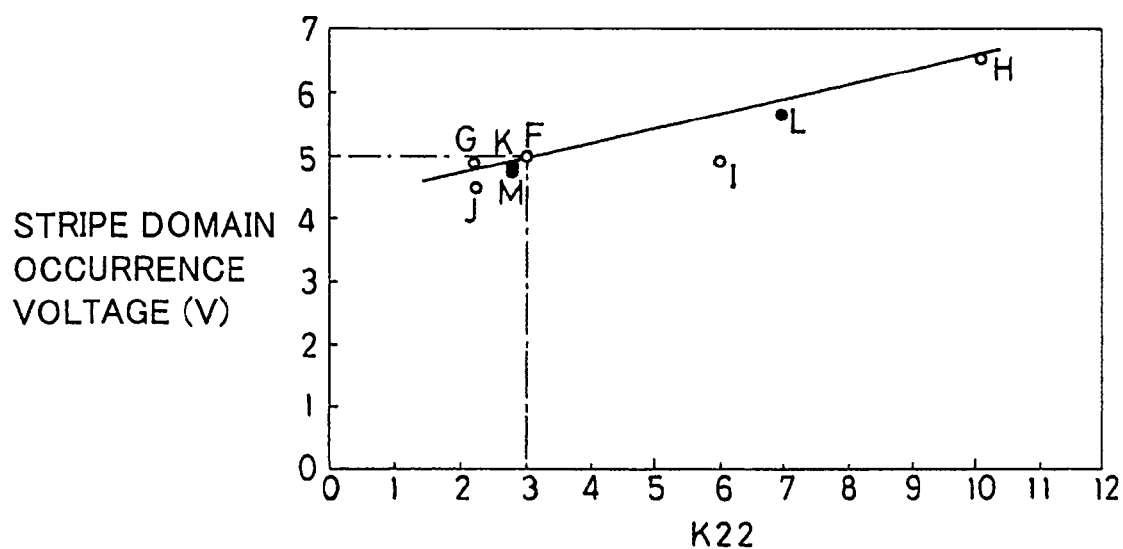
FIG. 6 is a view of a relationship of a twist elasticity modulus $K22$ and a stripe domain occurrence voltage when refractive index anisotropy $\Delta n$ is $0.18\leq\Delta n\leq0.20$.
Figure 7:
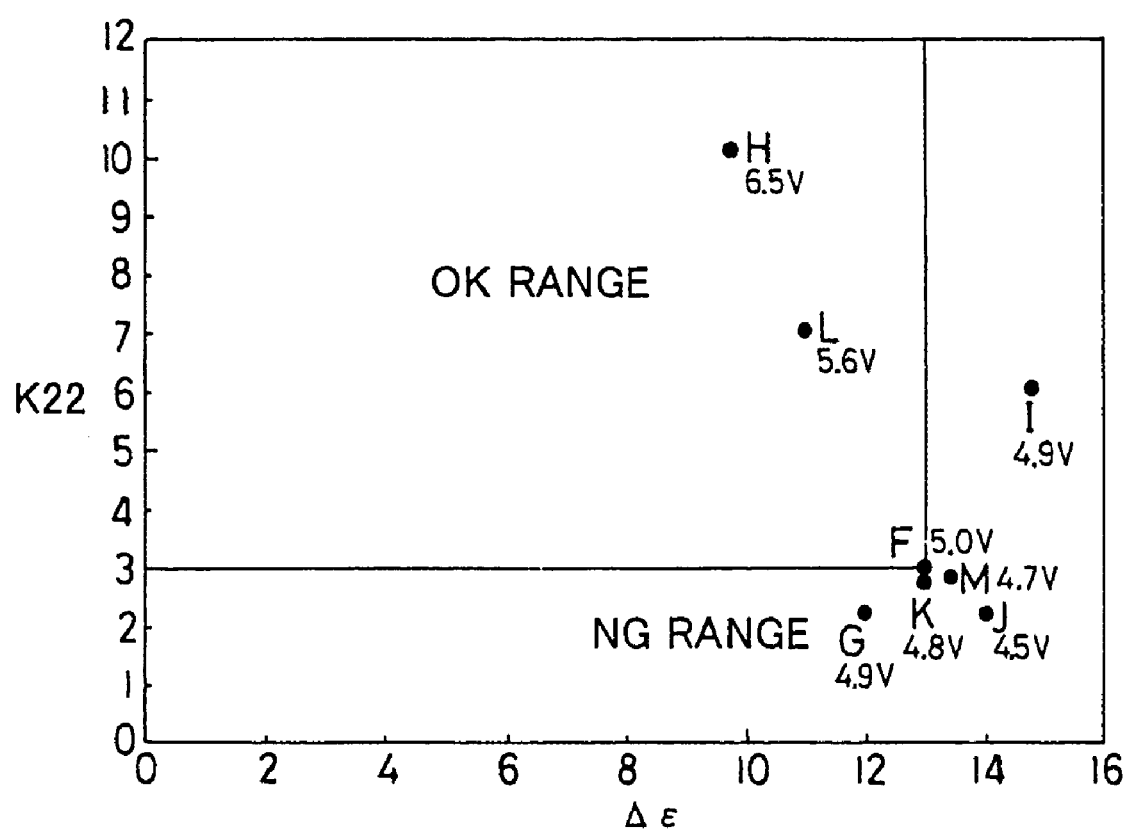
FIG. 7 is a view of a relationship of dielectric constant anisotropy $\Delta\in$ and a twist elasticity modulus $K22$ when refractive index anisotropy $\Delta n$ is $0.18\leq\Delta n\leq0.20$.

FIG. 5 to FIG. 7 are drawn based on the above measurement values. An evaluation was made on a relationship of the $\Delta\epsilon$ and a stripe domain occurrence voltage when varying the $\Delta\epsilon$, for example, by using liquid crystal materials of $\Delta n=0.18$ and $\Delta n=0.20$. The results will be explained with reference to FIG. 5. In FIG. 5, an axis of ordinate indicates the stripe domain occurrence voltage and an axis of abscissa indicates $\Delta\epsilon$.

As shown in FIG. 5, as the $\Delta\epsilon$ became smaller, the voltage of stripe domain occurrence became higher. Namely, the smaller the $\Delta\epsilon$ became, the harder a stripe domain was observed. The $\Delta\epsilon$ is a difference between a dielectric constant $\epsilon//$ on a long axis side and the dielectric constant $\epsilon^{\perp}$ on a short axis side of the liquid crystal. It is considered the smaller the $\Delta\epsilon$, the more balanced in terms of the molecular structure a liquid crystal molecular state becomes and harder to get affected by a crossing electric field. For example, when assuming the stripe domain occurrence voltage is 5V or more, the $\Delta\epsilon$ is required to be 13 or less when $0.18 \leq \Delta n \leq 0.20$. Since it is limited to the TN mode in the present invention, $\Delta\epsilon>0$. Thus, the $\Delta\epsilon$ becomes $0<\Delta\epsilon<13$.

Next, an evaluation was made on a relationship of the twist elasticity modulus K22 and a stripe domain occurrence voltage when varying the K22, for example, by using liquid crystal materials of $\Delta n=0.18$ and $\Delta n=0.20$. The results will be explained with reference to FIG. 6. In FIG. 6, an axis of ordinate indicates the stripe domain occurrence voltage and an axis of abscissa indicates K22.

As shown in FIG. 6, the larger the K22, the higher the voltage of stripe domain occurrence. Namely, the larger the K22, the harder a stripe domain was observed. For example, when assuming the stripe domain occurrence voltage is 5V or more, the K22 is required to be 3.0 pN or more when $0.18 \leq \Delta n \leq 0.20$. Thus, the K22 becomes K22>3.0.

Referring to FIG. 5 and FIG. 6, a view of a relationship of the K22 (an axis of ordinate) and the $\Delta\epsilon$ (an axis of abscissa) will be explained with reference to FIG. 7. As shown in FIG. 7, a twisted nematic type liquid crystal material used for a liquid crystal layer is required to satisfy the dielectric constant anisotropy $\Delta\epsilon$ of $0<\Delta\epsilon<13$ and the twist elasticity modulus K22 of K22>3.0 pN when the refractive index anisotropy $\Delta n$ is $0.18 \leq \Delta n \leq 0.20$ at 20° C.

Next, an example of the above active matrix drive type liquid crystal display element will be explained below.

Figure 8:
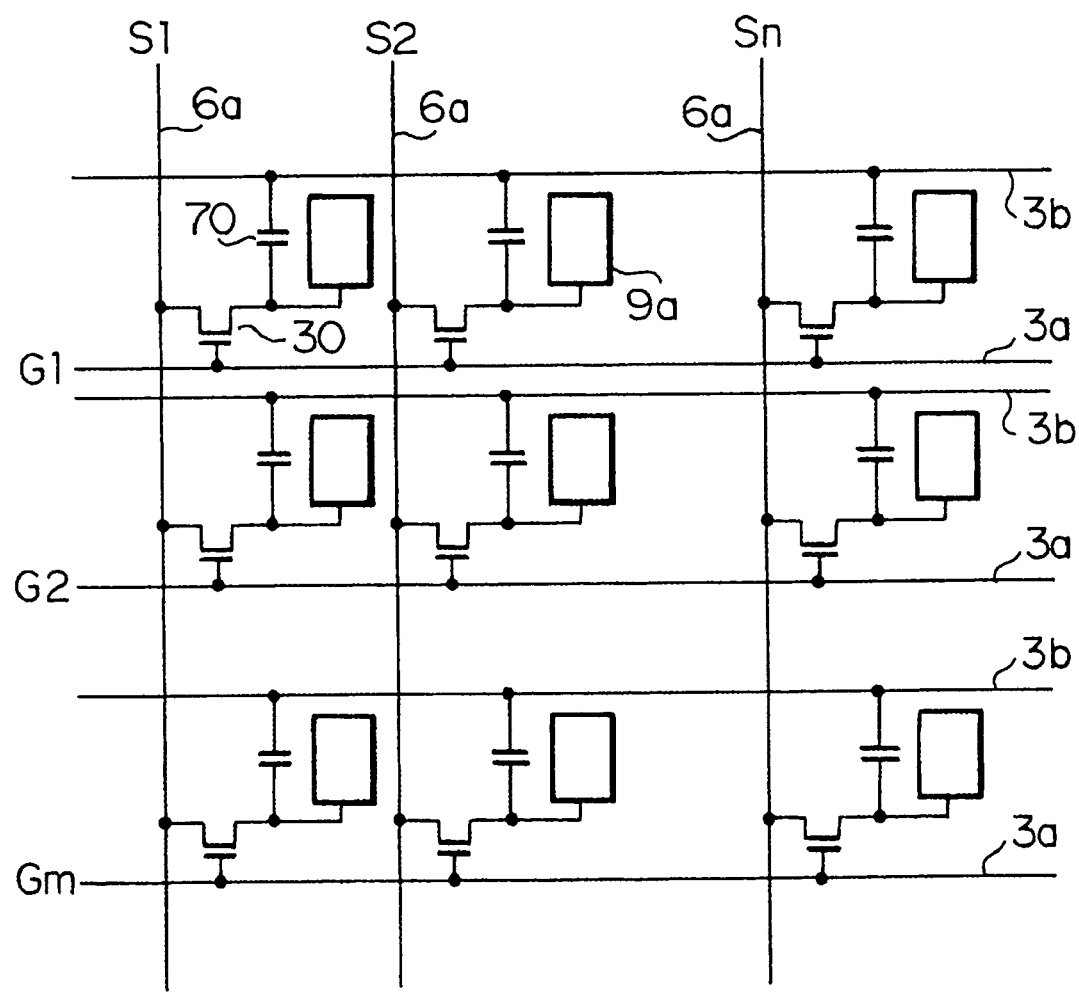
FIG. 8 is an equivalent circuit diagram of various elements and wiring, etc. provided to a plurality of pixels in matrix composing an image formation region in a liquid crystal display element according to an embodiment of the present invention.
Figure 9:
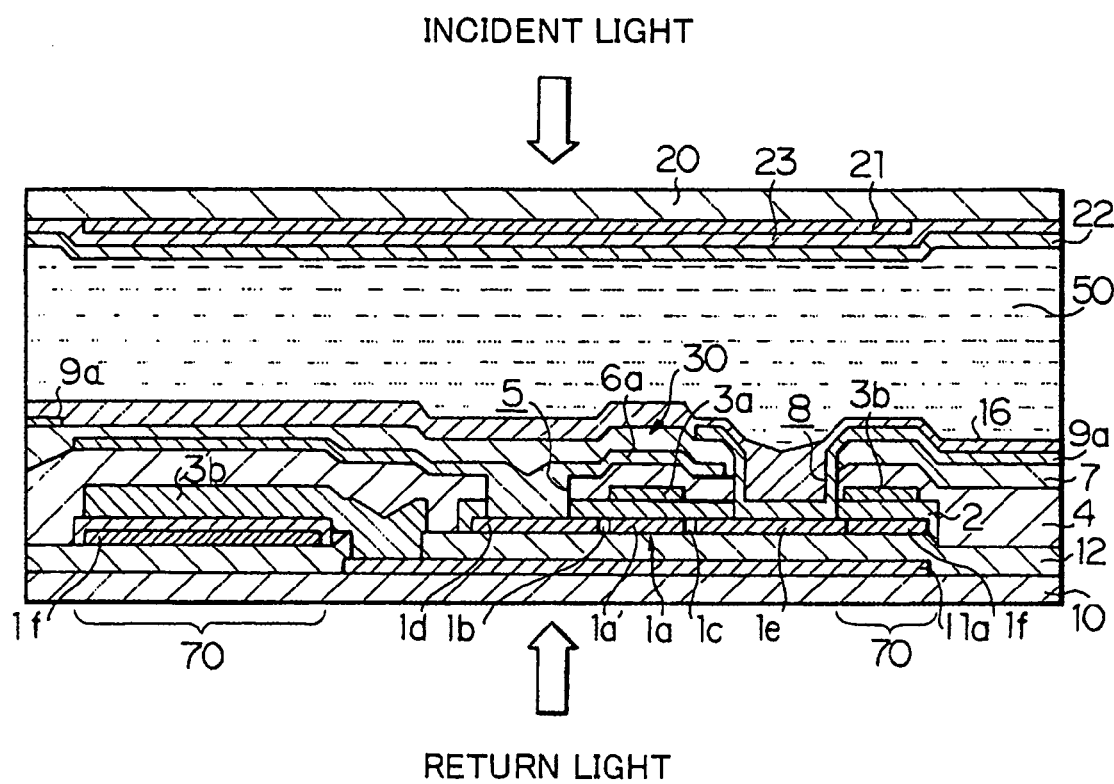
FIG. 9 is a sectional view of the schematic configuration of a liquid crystal display element according to an embodiment of the present invention.

FIG. 8 is an equivalent circuit diagram of various elements and wiring, etc. provided to a plurality of pixels in matrix composing an image formation region in a liquid crystal display element according to an embodiment of the present invention. FIG. 9 is a sectional view of the schematic configuration of a liquid crystal display element.

As shown in FIG. 8, an image display region of the liquid crystal display element is formed with a plurality of pixels in matrix and comprises the plurality of pixel electrodes 9a formed in matrix and a TFT 30 for controlling the pixel electrodes 9a. Furthermore, a source of the TFT 30 is electrically connected to a signal line 6a for supplying a pixel signal.

Pixel signals S1, S2, . . . Sn to be written to the signal line 6a are successively supplied for example in this order to the signal line, or supplied in a group for adjacent plurality of signals lines. A gate of the TFT 30 is electrically connected to a scanning line 3a. The scanning line 3a is configured to, for example, successively apply scanning signals G1, G2, . . . Gn to the scanning line at a predetermined timing, for example, like a pulse.

The pixel electrodes 9a are electrically connected to a drain of the TFT 30 serving as a switching element. For example, by closing a switch of the TFT 30 for a predetermined time, the pixel signals S1, S2, . . . Sn supplied from the signal line 6a are written at a predetermined timing. The pixel signals S1, S2, . . . Sn written in the liquid crystal via the pixel electrodes 9a are stored for a certain time between facing electrodes formed on the facing substrates.

The liquid crystal modulates a light as a result that the alignment and order of molecular aggregate are changed by a voltage level to be applied, so that gray scales can be displayed. For example, when it is normally white display, an incident light is capable of passing through the liquid crystal portion in accordance with an applied voltage, and a light having contrast in accordance with the pixel signals is emitted from the liquid crystal display element as a whole.

Here, to prevent leakage of a stored pixel signal, an accumulation capacity 70 is added in parallel with a liquid crystal capacity formed between the pixel electrodes 9a and the facing electrodes. For example, a voltage of the pixel electrodes 9a is held by the accumulation capacity for a time longer by three digits or more than a time the voltage is applied to the signal line. As a result, the holding characteristics are furthermore improved and a liquid crystal display element with high contrast ratio is realized. Also, to form such an accumulation capacity 70, a capacity line 3b made to have low resistance is provided by using a conductive light block film.

Next, the liquid crystal display element will be explained with reference to FIG. 9.

As shown in FIG. 9, the liquid crystal display element comprises a TFT array substrate 10 and a transparent facing substrate 20 facing to the TFT array substrate. For example, a quartz substrate may be used as the TFT array substrate 10, and a glass substrate and a quartz substrate may be used as the facing substrate 20.

The TFT array substrate 10 is provided with pixel electrodes 9a, and an alignment film 16 subjected to predetermined alignment processing, such as rubbing processing, is provided thereon. The pixel electrodes 9a are made by a transparent conductive thin film, such as an ITO film (indium tin oxide).

On the other hand, a facing electrode (common electrode) 21 is provided allover the facing substrate 20, and an alignment film 22 subjected to predetermined alignment processing, such as rubbing processing, is provided on its lower surface. The facing electrode 21 is made by a transparent conductive thin film, such as an ITO film. The respective alignment films 16 and 22 are made by a thin film of an organic material, such as a polyimide thin film.

Furthermore, between the alignment film 16 and the alignment film 22 is arranged a columnar spacer (not shown) made by a resin material having ultraviolet curing property. The columnar spacer is produced as below. After applying a resin material having an ultraviolet ray curing property on a surface of the substrate formed with the pixel electrodes 9a by using a spinner, patterning is performed to form an island shape by using a photolithography technique to form a columnar spacer (not shown). The columnar spacer may be formed by patterning after forming an inorganic film, such as a silicon oxide other than a photosensitive resin for example by the CVD method or after forming a non-photosensitive resin by a spin coat method or a printing method. A section area of the columnar spacer is, for example, 1 $\mu m^2$ to 100 $\mu m^2$.

The TFT array substrate 10 is provided with a pixel switching TFT 30 for controlling each of the pixel electrodes 9a by switching at a position adjacent to each pixel electrode 9a.

The facing substrate 20 is provided with a second light block film 23 on regions other than aperture areas of the respective pixel portions. Therefore, an incident light from the facing substrate 20 side does not enter an channel region 1a', LDD (lightly doped drain) region 1b and 1c of a semiconductor layer 1a of the pixel switching TFT 30. Furthermore, the second light block film 23 also serves for improving contrast and preventing mixture of color materials.

Between the thus configured TFT array substrate 10 and the facing substrate 20 arranged so that the pixel electrodes 9a faces the facing electrode 21, liquid crystal is encapsulated in a space surrounded by later explained seal and the liquid crystal layer 50 is formed. The liquid crystal layer 50 becomes a predetermined alignment state due to the alignment films 16 and 22 in a state of not being applied with an electric field by the pixel electrodes 9a. The liquid crystal layer 50 is made by liquid crystal obtained, for example, by mixing one or more kinds of nematic liquid crystal. The liquid crystal layer 50 used in the present invention is what explained with reference to FIG. 1 to FIG. 7 above.

The seal is composed of an adhesive, for example, made by a light (for example, an ultraviolet ray) curing resin and a thermosetting resin for putting together the TFT array substrate 10 and the facing substrate 20 around their periphery. To keep a predetermined distance between the two substrates, a glass fiber, glass beads or other spacer may be used other than the columnar spacer made by an ultraviolet ray curing resin as above.

A first light block film 11a is provided between the TFT array substrate 10 and each of the pixel switching TFT 30 at a position respectively facing to the pixel switching TFT 30. The first light block film 11a is preferably composed of a metal, alloy and metal silicide, etc. including at least one of titanium (Ti), chromium (Cr), tungsten (W), tantalum (Ta), molybdenum (Mo) and lead (Pb), which are opaque metals having a high melting point. When composed of such a material, the first light block film 11a does not break nor melt in high temperature processing in a process of forming the pixel switching TFT 30 performed after a process of forming the first light block film 11a on the TFT array substrate 10. Since the first light block film 11a is formed, the case where a return light from the TFT array substrate 10 side enters the channel region and LDD regions 1b and 1b on the pixel switching TFT 30 can be prevented in advance, and characteristics of the pixel switching TFT 30 are not deteriorated by generation of a light current.

Furthermore, a first interlayer insulation film 12 is provided between the first light block film 11a and the plurality of pixel switching TFT 30. The first interlayer insulation film 12 is provided to electrically insulating the semiconductor layer 1a composing the pixel switching TFT 30 from the first light block film 11a. The first interlayer insulation film 12 also serves as a base film for the pixel switching TFT 30 by being formed allover the TFT array substrate 10. Namely, it also has a function of preventing the characteristics of the pixel switching TFT 30 from deteriorating due to roughness of the surface caused by polishing and dirt remained after washing, etc.

The first interlayer film 12 is made by a highly insulative glass, such as BSG (non-dope silicate glass), PSG (phosphorous silicate glass), BSG (boron silicate glass) and BPSG (boron silicate glass), a silicon oxide film or a silicon nitride film, etc. The first interlayer insulation film 12 can also prevent the case that the first light block film 11a contaminates the pixel switching TFT 30 in advance.

Also, a gate insulation film 2 is provided to extend from a position facing to the scanning line 3a to form a first accumulation capacity electrode if, and a part of a capacity line 3b facing to them is made to be a second accumulation capacity electrode, so that the accumulation capacity 70 is configured.

More specifically, a high concentration drain region 1e of the semiconductor layer 1a is provided to extend beneath the signal line 6a and the scanning line 3a and provided to face via the insulation film 2 to a part of the capacity line 3b extending in the same way along the signal line 6a and the scanning line 3a to form a first accumulation capacity electrode (semiconductor layer) 1f. Particularly, the insulation film 2 as a dielectric of the accumulation capacity 70 is nothing but a gate insulation film 2 of the TFT 30 formed on a polysilicon film by high temperature oxidization, so that a thin insulation film having a high breakdown voltage can be attained and the accumulation capacity 70 can be configured to have a large capacity with a relatively small area.

Furthermore, in the accumulation capacity 70, the first light block film 11a is configured to be furthermore added an accumulation capacity by being provided as a third accumulation capacity electrode facing to the first accumulation capacity electrode 1f via the first interlayer insulation film 12 on the opposite side of the capacity line 3b as a second accumulation capacity electrode (refer to the accumulation capacity 70 on the right side in FIG. 9).

Also, the pixel switching TFT 30 has an LDD (lightly doped drain) structure and comprises a channel region 1a' of the semiconductor layer 1a to be formed a channel by an electric field from the scanning line 3a, a gate insulation film 2 for insulating the scanning line 3a and the semiconductor layer 1a, a signal line 6a, a low concentration source region (source side LDD region) 1b and a low concentration drain region (drain side LDD region) 1c of the semiconductor layer 1a, a high concentration-source region 1d and high concentration drain region 1e of the semiconductor layer 1a.

The high concentration drain region 1e is connected to corresponding one among the plurality of pixel electrodes 9a. The source regions 1b and 1d and drain regions 1c and 1e are formed by being doped with an n-type dopant or a p-type dopant of a predetermined concentration in accordance with which channel to form, n-type or p-type. An n-type channel TFT has an advantage of operating at a high speed and is often used as the pixel switching TFT as a switching element of a pixel. The signal line 6a is composed of a light blocking thin film, such as a metal film of Al, etc. and an alloy film of metal silicide, etc.

Also, a second interlayer insulation film 4 formed with a contact hole 5 being open to the high concentration source region 1d, a contact hole 5 being open to the high concentration drain region 1e, and a contact hole 8 being open to the high concentration drain region 1e is formed on the scanning line 3a, gate insulation film 12 and first interlayer insulation film 12.

The signal line 6a is electrically connected to the high concentration source region via the contact hole 5 open to the source region 1b. Furthermore, on the signal line 6a and the second interlayer insulation film 4, a third interlayer insulation film 7 having a contact hole 8 being open to the high concentration drain region 1e is formed. The pixel electrodes 9a are provided on the upper surface of the third interlayer insulation film 7 configured as such via the contact hole open to the high concentration drain region 1e. Note that the pixel electrodes 9a and the high concentration drain region 1e may be electrically connected via a same aluminum film as the signal line 6a or a same polysilicon film as the scanning line 3b.

The pixel switching TFT 30 preferably has the LDD structure as above, but may have an offset structure wherein impurity ions are not implanted to the low concentration source region 1b nor the low concentration drain region 1c, or may be a self-align type TFT for forming a high concentration source and drain regions in a self-aligning way by implanting impurity ions at high concentration by using the gate electrode 3a as a mask.

Figure 10A:
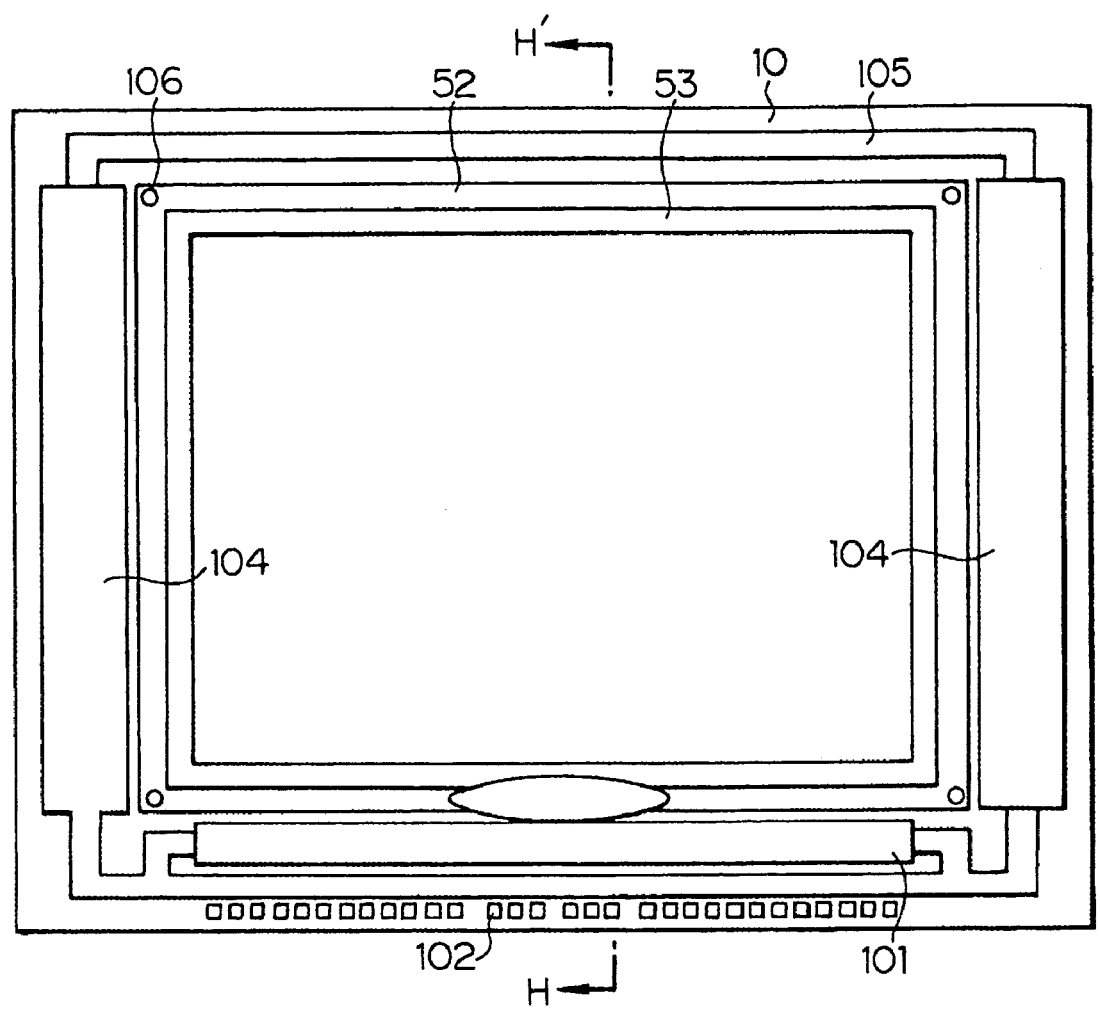
FIG. 10A is a plan view looking from the facing substrate side a TFT array substrate and components formed thereon and FIG. 10B is a sectional view along the line H—H in an embodiment of a liquid crystal display element.
Figure 10B:
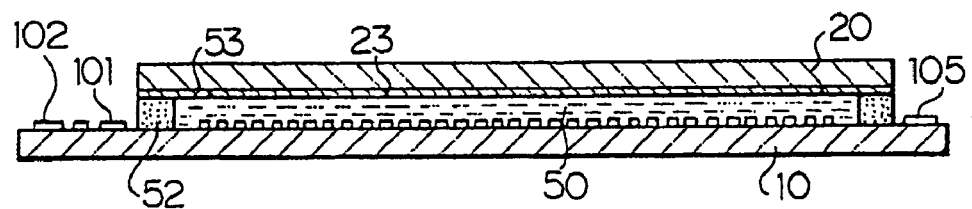

Next, FIG. 10A is a plan view looking from the facing substrate 20 side a TFT array substrate 10 and components formed thereon and FIG. 10B is a sectional view along the line H–H' in FIG. 10A showing by including the facing substrate 20.

As shown in FIG. 10, a seal 52 is provided on the TFT array substrate 10 along its periphery. Inside thereof, in parallel with the seal 52, for example, a light block film 53 as a break line from around is formed as the same layer with the second light block film 23 or as a separate layer.

On a region outside the seal 52, a signal line drive circuit 101 and a packaging terminal 102 are provided along one side of the TFT array substrate 10. Furthermore, scanning line drive circuits 104 are provided along two sides adjacent to the one side provided with the signal line drive circuit 101 and the packaging terminal 102. The scanning drive circuit 104 may be provided only on one side as far as delay of a scanning signal supplied to the scanning line does not become disadvantageous.

Also, the above signal line drive circuit 101 may be arranged on both sides along a side of a screen display region. For example, data lines on odd rows may supply an image signal from a signal line drive circuit provided along one side of the screen display region, and signals lines on even rows may supply an image signal from a signal line drive circuit provided along a side on the opposite side of the screen display region. By driving the signal lines in a comb tooth shape as above, an area occupied by the signal line drive circuit can be expanded and a complex circuit can be configured.

Furthermore, on remaining one side of the TFT array substrate 10, a plurality of wirings 105 are provided for connecting between the scanning line drive circuits 104 provided on both sides of the screen display region, and a precharge circuit (not shown) may be furthermore provided as a break line from around beneath the light block film 53.

Also, at least one position of corner portions of the facing substrate 20, a conductive material 106 is provided for electrically conducting the TFT array substrate 10 and the facing substrate 20.

The facing substrate 20 having almost the same outline with that of the seal 52 is fixed by being adhered by the seal 52 to the TFT array substrate 10.

The TFT array substrate 10 of the liquid crystal display element in the above embodiments may be furthermore formed thereon a test circuit, etc. for testing quality and defect, etc. of the liquid crystal display element during production or at shipping.

Alternately, instead of providing the signal line drive circuit 101 and the scanning line drive circuit 104 on the TFT array substrate 10, for example, electric or mechanical connection to a drive LSI mounted on a TAB (tape automated bonding substrate) may be made via an anisotropic conductive film provided around the TFT array substrate 10.

Also, on the side a projection light of the facing substrate 20 emits, a light refractive film, a phase difference film and a light refractive means, etc. may be arranged in a predetermined direction in accordance with normally white display or normally black display in a TN (twisted nematic) mode, respectively.

When the liquid crystal display element in the present embodiment is applied to a color liquid crystal projector (a projection type display device), three liquid crystal devices are used respectively as light valves of RGB, and each panel receives a decomposed light of each color via a dynamic mirror for RGB decomposition. Accordingly, the facing substrate 20 is not provided with any color filters. However, RGB color filters may be formed at a predetermined region facing to pixel electrodes 9a not formed with the second light block film 23 on the facing substrate 20 together with its protective film. In this way, the liquid crystal display element of the embodiments can be applied to color liquid crystal display elements, such as a direct viewing type or reflective type color liquid crystal television, other than a liquid crystal projector.

Furthermore, a microlens may be formed corresponding to each pixel on the facing substrate 20. In this way, the light convergence efficiency of the incident light is improved and a bright liquid crystal display element can be realized.

Also, by stacking a plurality of interference layers having different refraction indexes on the facing substrate 20, a dichroic filter for producing RGB colors by using interference of lights may be formed. According to a facing substrate with the dichroic filter, brighter color liquid crystal display element can be realized.

Also, a switching element provided for each pixel was explained to be a positive stagger type or coplanar type polysilicon TFT, but the above embodiment is useful in a reverse stagger type TFT, amorphous silicon or other types of TFT.

Next, an example of production process of the liquid crystal display element will be explained based on FIG. 11.

Figure 11:
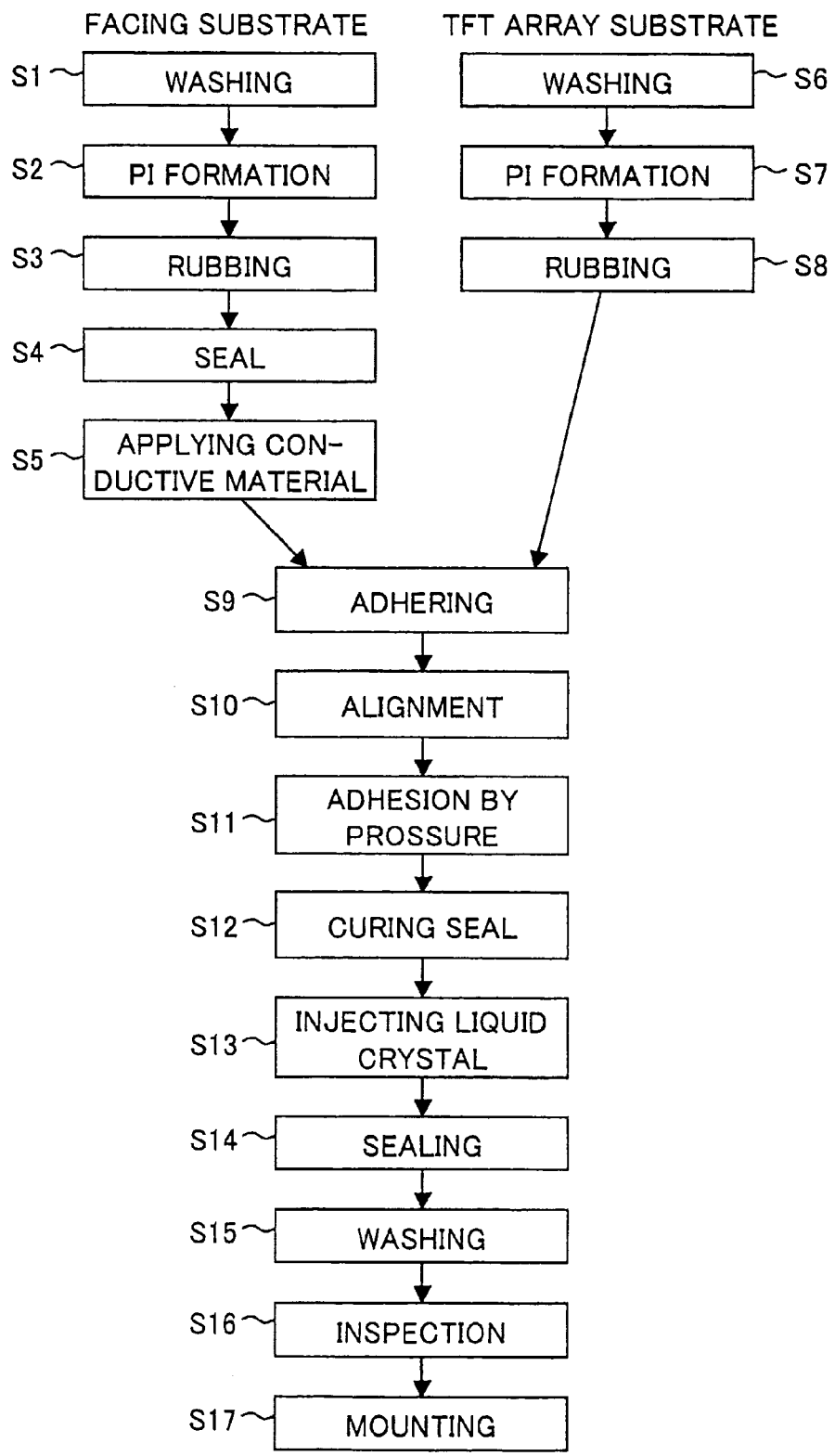
FIG. 11 is a view of production procedure for explaining production processes of a liquid crystal display element of the present invention.

As shown in FIG. 11, it is divided to a process on the TFT array substrate side, a process on the facing substrate side and a process after putting the two substrates together.

In the process on the TFT array substrate side, in a step S1, washing is performed for removing dirt adhered to a substrate of quartz, etc. formed with a pixel electrode, TFT 6 element, and wiring of scanning line and data line. Next, in a step S2, alignment film is formed. Specifically, after forming a polyimide material on the substrate by a method of spin coat, printing and ink jet, etc., firing processing is performed to form the alignment film.

Next, in a step S3, alignment processing is performed on the formed alignment film, for example, by a rubbing method for rubbing in a certain direction. At this time, it is possible to make the liquid crystal to be aligned in a predetermined direction and to give a predetermined pre-tilt angle to the liquid crystal by selection of the above polyimide material and rubbing conditions I the rubbing processing.

Next, in a step S4, a seal region is formed by printing a seal including a gap material. Furthermore, in a step S5, an upper and lower conducting material is applied, for example, at four corners of the seal for formation.

In the process on the facing substrate side, in a step S6, washing is performed to remove dirt adhered to the facing substrate made by forming a facing electrode and wiring, etc. on the glass substrate. Next, in a step S7, an alignment film is formed. Specifically, after forming a polyimide material on the substrate by a method of spin coat, printing and ink jet, etc., firing processing is performed to form the alignment film.

Next, in a step S8, alignment processing is performed on the formed alignment film, for example, by a rubbing method for rubbing in a certain direction. At this time, it is possible to make the liquid crystal to be aligned in a predetermined direction and to give a predetermined pre-tilt angle to the liquid crystal by selection of the above polyimide material and rubbing conditions I the rubbing processing.

Next, in a step S9, the TFT array substrate 1 obtained through the steps S1 to S5 and the facing substrate obtained through the steps S6 to S8 are put together with a seal. After that, alignment is performed in a step S10 and a gap between the substrates is pressed to obtain a desired liquid crystal cell gap in a step S11. A desired gap between the substrates is obtained by the gap material included in the seal.

Next, in a step S13, the seal is cured by irradiating an ultraviolet ray and/or heating. Next, liquid crystal injection process using the liquid crystal material of the present invention will be performed.

First, in a step S14, a liquid crystal inlet is sealed with a sealing material, and washing is performed again in a step S15. Furthermore, after conducting tests on predetermined display unevenness and properties in a step S16, packaging processing of connecting to external wiring and attaching of a light refractive plate, etc. is performed in a step S17, so that a liquid crystal display element is completed. Evaluation results explained in FIG. 2 to FIG. 7 are obtained by evaluating image quality by using thus produced liquid crystal display element.

Also, when studying a relationship of other property values and stripe domain occurrence, it was found that there were tendencies in relationships of a ratio of K33 and K22 (K33/K22), a ratio of K22 and K11 (K22/K11) and stripe domain occurrence. To bring the stripe domain favorable, the smaller K33/K22 is preferable and the larger K22/K11 is preferable.

In the liquid crystal display device of the present invention explained above, one having a cell gap of 2.0 μm or more and 3.0 μm or less was used. The cell gap of the liquid crystal display element measured data shown in FIG. 2 to FIG. 7 explained above was 3.0 μm. The reason of setting the cell gap to be 2.0 μm or more is because the optimal cell gap is 2.4 μm when Δn=0.20. This is obtained by the gooch-tarry formula. By narrowing the cell gap, the transmissivity declines, while the stripe domain tends to be improved due to a strong affect of a vertical electric field and an LCD with high contrast can be obtained. On the other hand, when the cell gap becomes narrower than 2.0 μm, the yield declines due to an affect by dust and productivity declines. Thus, the cell gap was set to be 2.0 μm or more. While, when Δn=0.16, the cell gap for attaining the maximum transmissivity becomes 3.0 μm from the gooch-tarry formula. Thus, the cell gap "d" was set to be $2.0\ \mu m \leq d \leq 3.0\ \mu m$.

For example, an evaluation was made on characteristics by sealing a liquid crystal material of Δn=0.18 in a vacant cell of a liquid crystal display element having a gap of 2.4 μm. The stripe domain occurrence voltage became larger in the configuration of using a liquid crystal material of Δn=0.16 and having a cell gap of d=3.0 μm than that in the configuration of using a liquid crystal material of Δn=0.18 and having a cell gap of d=2.4 μm. When the cell gap becomes small, the occurrence voltage of a stripe domain becomes high. Namely, it becomes strongly resistible against a stripe domain by designing to use a liquid crystal material of Δn=0.18 and make a cell gap d=2.4 μm, so that it becomes possible to obtain finer display while maintaining brightness.

Also, a pixel size of a pixel in the liquid crystal display element of the present invention was made to be 18 μm or less. This is to make it possible to apply a pixel size of a highly accurate liquid crystal display element. The lower limit of the pixel size is currently 14 μm. but it can be applied to a liquid crystal display element with a still finer pixel size of, for example, 5 μm as techniques develop in the future.

As an example of electronic devices using the above liquid crystal display element, the configuration of a projection type display device will be explained with reference to a schematic view of the configuration in FIG. 12.

Figure 12:
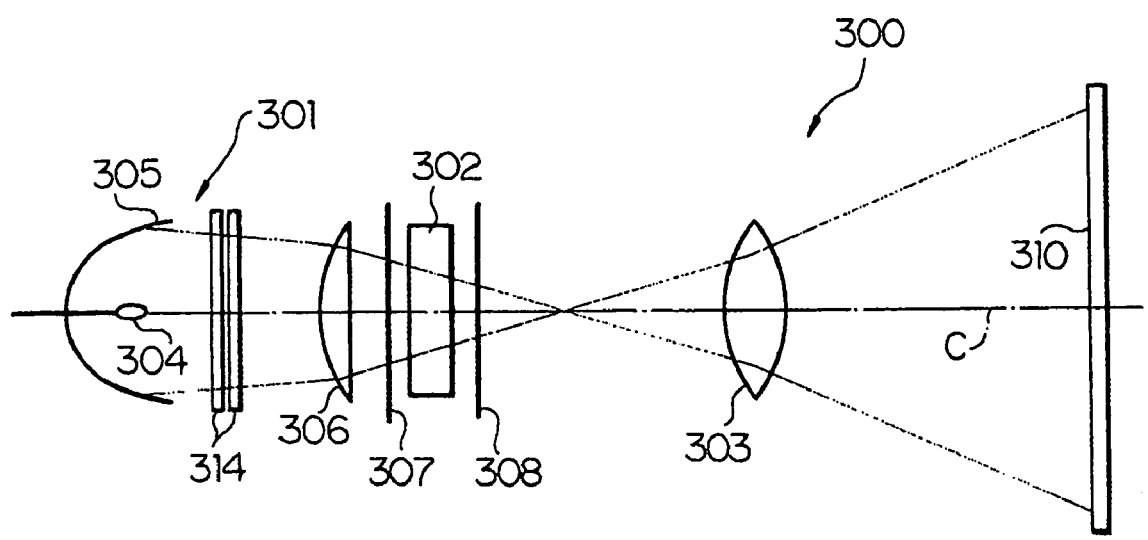
FIG. 12 is a view of the schematic configuration of a projection type display device as an example of electronic devices using a liquid crystal display element.

As shown in FIG. 12, a projection type liquid crystal display device (liquid crystal projector) 300 is configured by arranging a light source 301, a transmittance liquid crystal display element 302 and a projection optical system 303 in order along a light axis C.

A reflector 305 makes components emitted backwardly in a light emitted from a lamp 304 composing the light source 301 converged to the forward direction to enter into a condenser lens 306. The condenser lens 306 makes the light furthermore converged to introduce to the liquid crystal display element 302 via an incident side light refractive plate 307. The introduced light is converted to an image by the liquid crystal display element 302 having a function of a shutter or a light valve and emission light refractive plate 308. The displayed image is enlarged to be projected on the screen 310 via the projection optical system 303.

Note that a filter 314 is inserted between the light source 301 and the condenser lens 306 for removing a light having unnecessary waveforms, for example, an infrared ray and ultraviolet ray included in the light source.

Figure 13:
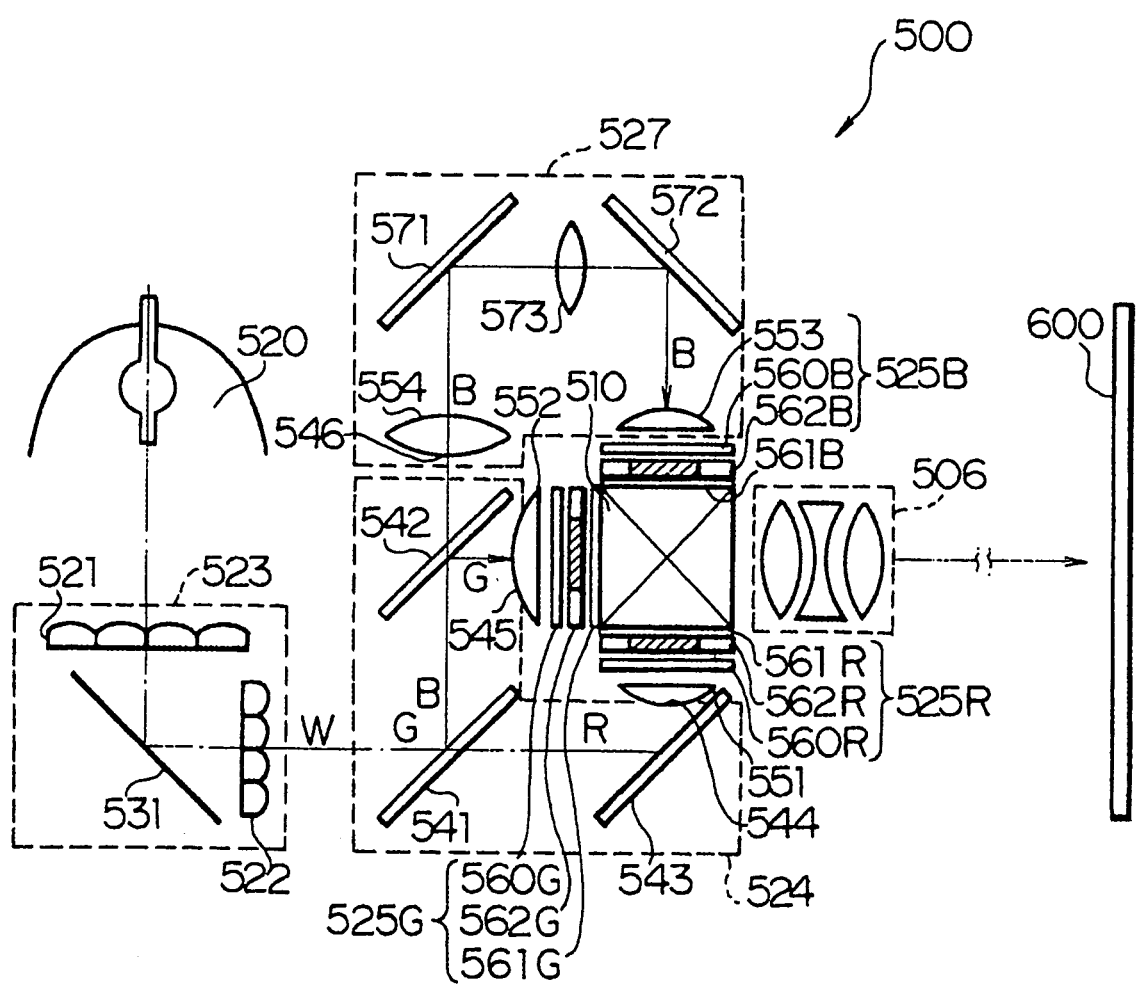
FIG. 13 is a view of the schematic configuration of a projection type display device as an example of electronic devices using a liquid crystal display element.
Figure 14:
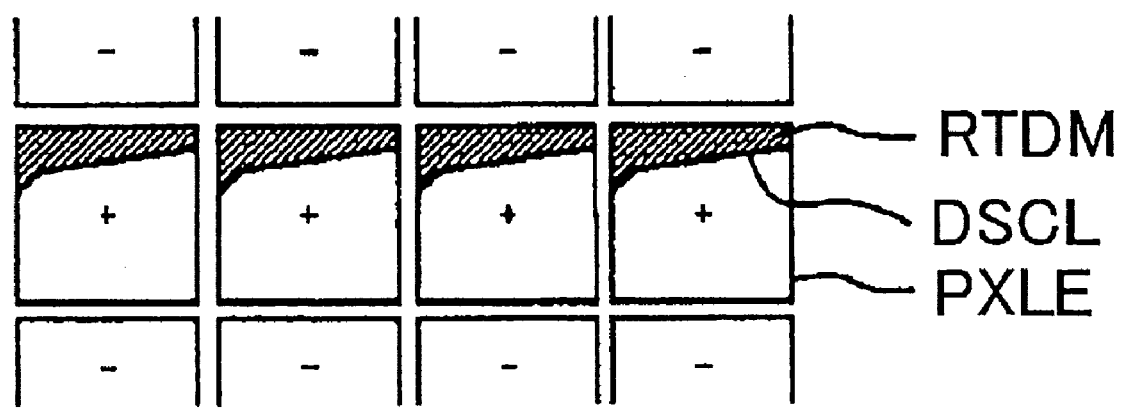
FIG. 14 is a view for explaining a reverse tilt domain generated in a liquid crystal cell of the related art.
Figure 15:
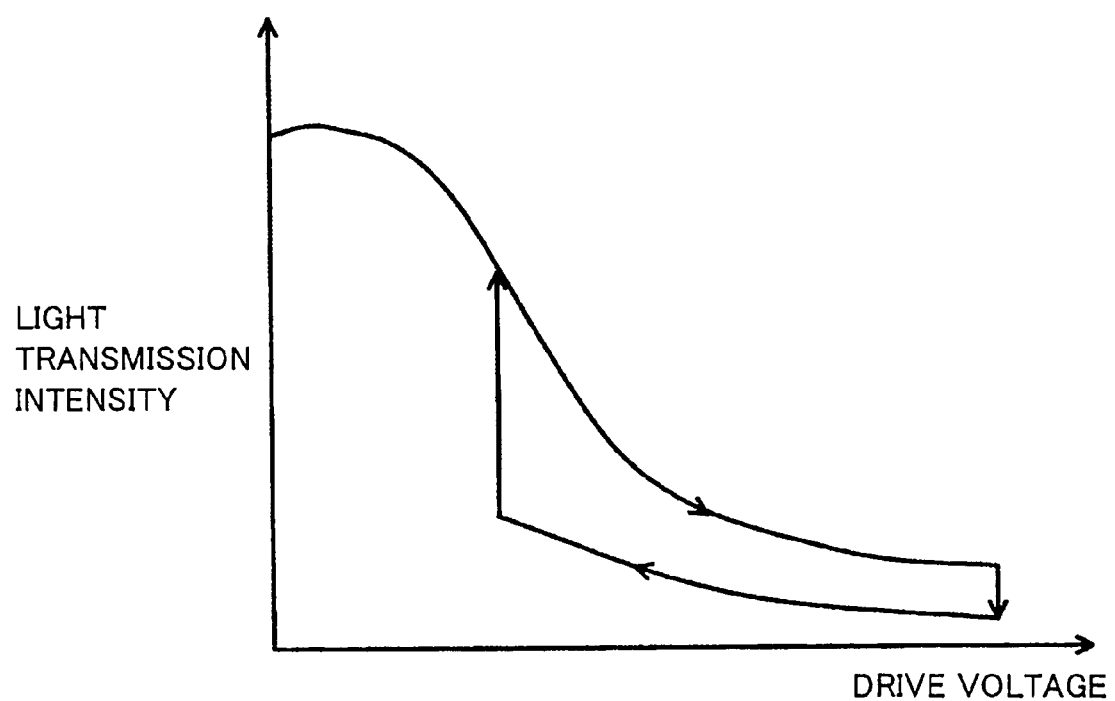
FIG. 15 is a view for explaining a disadvantage where hysteresis arises between light transmissivity intensity and a drive voltage in a liquid crystal cell of the related art.

Next, as an example of electronic devices using the above liquid crystal display element, the configuration of a projection type display device will be explained with reference to FIG. 13. A projection type display device 500 shown in FIG. 13 has an optical system of a projection type liquid crystal display device using three liquid crystal display elements as above as liquid crystal display elements 562R, 562G and 562B for respective RGB, and the schematic view of the configuration is shown in FIG. 13.

The projection type display device 500 uses a light source device 520 and a uniform light optical system 523 as the optical system. A color separation optical system 524 as a color separation means for separating a light flux W emitted from the uniform light optical system 523 to red (R), green (G) and blue (B), three light valves 525R, 525G and 525B as modulation means for modulating respective light fluxes R, G and B, a color composition prism 510 as a color composition means for recomposing modulated color light fluxes, and a projection lens unit 506 as a projection means for enlarging and projecting the composed light flux on a surface of a projection face 600 are provided. Furthermore, a light guide system 527 for guiding the blue light flux B to the light valve 525B is provided.

The uniform light optical system 523 comprises two lens plates 521 and 522 and a reflection mirror 531, wherein the two lens plates 521 and 522 are orthogonally arranged and the reflection mirror 531 is put between them. The two lens plates 521 and 522 of the uniform light optical system 523 respectively comprise a plurality of rectangular lens arranged in matrix.

The light flux emitted from the light source device 520 is divided to a plurality of partial light fluxes by the rectangular lens of the first lens plate 521. Then, the partial light fluxes are superimposed near the three light valves 525R, 525G and 525B by the rectangular lens of the second lens plate 522.

Accordingly, by using the uniform light optical system 523, even when the light source device 520 has an uneven illuminance distribution in a section face of the emitted light flux, the three light valves 525R, 525G and 525B can be illuminated with a uniform illumination light.

The respective separation optical system 524 comprises a blue green reflection dichroic mirror 541, a green reflection dichroic mirror 542 and a reflection mirror 543. First, the blue light flux B and the green light flux G included in the light flux W are reflected at a right angle on the blue green reflection dichroic mirror 541 to be in the direction of the green reflection dichroic mirror 542. The red light flux R passes through the blue green dichroic mirror 541, reflects at a right angle on the reflection mirror 543 at the back, and emitted from a red light flux emission portion 544 to the prism unit 510 side.

Next, on the green reflection dichroic mirror 542, only the green light flux G among the blue light flux B and the green light flux reflected on the blue green reflection dichroic mirror 541 is reflected at a right angle and emitted from the emission portion 545 of the green light flux G to the color composition optical system side. The blue light flux B passed through the green reflection dichroic mirror 542 is emitted from a blue light flux B emission portion 546 to the light guide system 527 side. Here, distances from the light flux W emission portion of the uniform light optical system 523 to the respective color light flux emission portions 544, 545 and 546 in the color separation optical system 524 are set to be almost the same.

A light convergence lens 551 and the light convergence lens 552 are arranged on the respective emission sides of the red light flux R emission portion 544 and the green light flux G emission portion 545 of the color separation optical system 524. Accordingly, the red light flux R and the green light flux G emitted from the respective emission portions enter the light convergence lens 551 and the light convergence lens 552 to be in parallel. The red light flux R and the green light flux G made to be in parallel respectively enters the light valve 525R and the light valve 525G, modulated and added with image information corresponding to the respective color.

Namely, the liquid crystal display elements are under switching control by a not shown drive means in accordance with the image information, consequently, the respective lights passing therethrough are modulated. On the other hand, the blue light flux B is guided to the corresponding light valve 525B via the light guide system 527 and modulated there.

Note that the light valves 525R, 525G and 525B of the present example are liquid crystal light valves respectively furthermore comprising incident side light refractive means 561R, 561G and 561B and liquid crystal display elements 562R, 562G and 562B arranged between them.

The light guide system 527 comprises a light convergence lens 554 arranged on the emission side of the blue light flux B emission portion 546, an incident side reflection mirror 571, an injection side reflection mirror 572, a middle lens arranged between the reflection mirrors, and a light convergence lens 553 arranged on the front side light valve 525B.

The blue light flux emitted from the light convergence lens 546 is guided by the liquid crystal display element 562B via the light guide system 527 and modulated. In light path lengths of the respective light fluxes, that is, distances from the light flux W emission portion to the respective liquid crystal display elements 562R, 562G and 562B, a distance to the blue light flux B becomes the longest, so that a light amount loss of the blue light flux becomes the largest. However, due to the provision of the light guide system 527, the light amount loss can be suppressed.

The respective light fluxes R, G and B modulated by passing through the respective light valves 525R, 525G and 525B are emitted to the color composition prism 510 and composed thereby. Then, a light composed by the color composition prism 510 is enlarged and projected on the surface of the projection face 600 at a predetermined position via the projection lens unit 506.

The embodiments explained above are for easier understanding of the present invention and not to limit the present invention. Accordingly, respective elements disclosed in the above embodiments include all modifications in designs and equivalents belonging to the technical field of the present invention.

What is claimed is:

1. A liquid crystal display element configured by holding a liquid crystal layer between a pair of substrates arranged to face to each other, wherein:

a twisted nematic type liquid crystal material used in said liquid crystal layer satisfies dielectric constant anisotropy $\Delta\varepsilon$ of $0<\Delta\varepsilon<8$ and twist elasticity modulus K22 of K22>6.0 pN when the refractive index anisotropy $\Delta n$ is $0.16 \leq \Delta n \leq 0.18$.

2. A liquid crystal display element as set forth in claim 1, wherein a range of a cell gap d indicating a distance between said substrates of said liquid crystal display element is 2.0 µm≦d≦3.0 µm.

3. A liquid crystal display element as set forth in claim 1, wherein a range of a pixel size of a pixel of said liquid crystal display element is 18 µm or less.

4. The liquid crystal display element as recited in claim 1, wherein a stripe domain occurrence voltage applied between said pair of substrates is equal to or greater than 5 volts.

5. A projection type display device comprising:

a light source;

a light convergence optical system for guiding a light emitted from said light source to a liquid crystal display element; and a projection optical system for enlarging and projecting a light subjected to light modulation by said liquid crystal display element;

wherein said liquid crystal display element is configured by holding a liquid crystal layer between a pair of substrates arranged to face to each other, and a twisted nematic type liquid crystal material used in said liquid crystal layer satisfies dielectric constant anisotropy $\Delta\in$ of $0<\Delta\in<8$ and twist elasticity modulus K22 of K22>6.0 pN when the refractive index anisotropy $\Delta n$ is $0.16\leq\Delta n\leq0.18$.

6. The projection type display device as recited in claim 5, wherein a stripe domain occurrence voltage applied between said pair of substrates is equal to or greater than 5 volts.

* * * * *